(12) United States Patent
Chang

(10) Patent No.: US 7,674,009 B2
(45) Date of Patent: Mar. 9, 2010

(54) LED LAMP ASSEMBLY

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 99 days.

(21) Appl. No.: 11/861,308

(22) Filed: Sep. 26, 2007

(65) Prior Publication Data
US 2008/0259608 A1 Oct. 23, 2008

(30) Foreign Application Priority Data
Apr. 20, 2007 (CN) .................. 2007 1 0200496

(51) Int. Cl.
*F21S 4/00* (2006.01)
(52) U.S. Cl. .................. 362/249.02; 362/800; 362/612; 362/97.3
(58) Field of Classification Search .................. 362/249, 362/252, 612, 97.1–97.3, 249.02, 249.06, 362/800; 349/6, 65, 692
See application file for complete search history.

(56) References Cited
U.S. PATENT DOCUMENTS

| | | | | |
|---|---|---|---|---|
| 5,018,290 A | * | 5/1991 | Kozek et al. .................. 40/570 |
| 5,887,968 A | * | 3/1999 | Logan .................. 362/241 |
| 5,954,423 A | * | 9/1999 | Logan et al. .................. 362/235 |
| 7,172,324 B2 | * | 2/2007 | Wu et al. .................. 362/559 |
| 2005/0243576 A1 | * | 11/2005 | Park et al. .................. 362/612 |
| 2007/0002590 A1 | * | 1/2007 | Jang et al. .................. 362/633 |
| 2007/0091640 A1 | * | 4/2007 | Kim et al. .................. 362/612 |

* cited by examiner

*Primary Examiner*—Jong-Suk (James) Lee
*Assistant Examiner*—Robert J May
(74) *Attorney, Agent, or Firm*—Frank R. Niranjan

(57) ABSTRACT

An exemplary LED lamp assembly includes a housing (21), a printed circuit board (22), one or more LEDs (23), a light reflective module (24) and a lamp cover (25). The housing includes a top cover (211), a base sheet (213), a plurality of sidewalls (215), and an opening (218). LEDs are electrically connected to the printed circuit board on the base sheet includes a light-emitting side surface (233) and a top surface (235), a portion of the light-emitting side surface facing the opening, and the top surface facing the top cover. The reflective module defines a through hole (247) for allowing the LED passing therethrough. The first-light-distributing member (26) is located in the housing between the LED and the opening. The lamp cover covers the opening.

10 Claims, 3 Drawing Sheets

LED LAMP ASSEMBLY

CROSS-REFERENCE TO RELATED APPLICATIONS

This application is related to one copending U.S. patent application, which is: application Ser. No. 11/831,309, filed on Sep. 26, 2007, and entitled "LED LAMP ASSEMBLY", by Shao-Han Chang. Such copending application has the same assignee as the present application.

BACKGROUND OF THE INVENTION

1. Field of the Invention

The present invention relates to a lamp assembly, and more particularly to a light-emitting diode lamp assembly employed in a direct type backlight module of a liquid crystal display.

2. Discussion of the Related Art

Typically, light-emitting diode (hereinafter called LED) has advantages such as low energy consumption, long service life, and so on. Therefore, LEDs are widely used in lamps.

Typically, FIG. 3 illustrates an LED lamp assembly 10 using LEDs 13 as a light source. The LED lamp assembly 10 includes a housing 11, a printed circuit board 12, a plurality of side-emitting type LEDs 13, a light reflective module 14, a plurality of round reflective sheets 15, and a lamp cover 16. The housing 11 is an elongated, hollow structure having an opening 112. The LEDs 13 are arranged apart and electrically connected to the printed circuit board 12. The printed circuit board 12 with the LEDs 13 is disposed on a bottom surface of the housing 11. The light reflective module 14 includes a rectangular bottom reflective plate 144 and four connecting sidewalls 142 extending around a periphery of the bottom reflective plate 144. The bottom reflective plate 144 defines a plurality of through holes 146 corresponding to the LEDs 13, thus allowing light-emitting portions of the LEDs 13 to pass through. The light reflective module 14 can be mounted into the housing 11 via the opening 112. The round reflective sheets 15 are positioned at the tops of the LEDs 13 respectively. The lamp cover 16 seals the opening 112 of the housing 11. Light from the light-emitting portions of the LEDs 13 is substantially reflected at either the sidewalls 142 or the bottom reflective plate 144, finally exiting the lamp cover 16. With the help of the light reflective module 14, an efficiency of light energy utilization of the LED lamp 10 is increased.

Generally, in order to enhance a uniformity of light exiting from the backlight module 10, there must be a definite space between the LEDs 13 and the lamp cover 16 to prevent dark strips caused by reduced intensity of light between adjacent lamps 13 from appearing on the lamp cover 16. Therefore, a volume of the LED lamp assembly 10 is still definitely large.

What is needed, therefore, is an LED lamp assembly which has a small volume.

SUMMARY

An LED lamp assembly includes a housing, a printed circuit board, one or more LEDs, a light reflective module, a first light distributing member and a lamp cover. The housing includes a top cover, a base sheet facing the top cover, a plurality of sidewalls connecting the top cover and the base sheet, and an opening defined on one of the sidewalls. The printed circuit board is positioned on the base sheet. The LEDs are electrically connected to the printed circuit board. The LED includes a light-emitting side surface and a top surface adjoining the light-emitting side surface, a portion of the light-emitting side surface facing the opening, and the top surface facing the top cover. The reflective module has a bottom reflective member located above the base sheet. The bottom reflective member defines a through hole for allowing the LED passing therethrough. The first light distributing member is located in the housing between the LED and the opening. The lamp cover covers the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present LED lamp assembly. Moreover, in the drawings, like reference numerals designate corresponding parts throughout the several views, and all the views are schematic.

DETAILED DESCRIPTION OF THE PREFERRED EMBODIMENTS

References will now be made to the drawings to describe preferred embodiments of the present LED lamp assembly, in detail.

Figure 1:
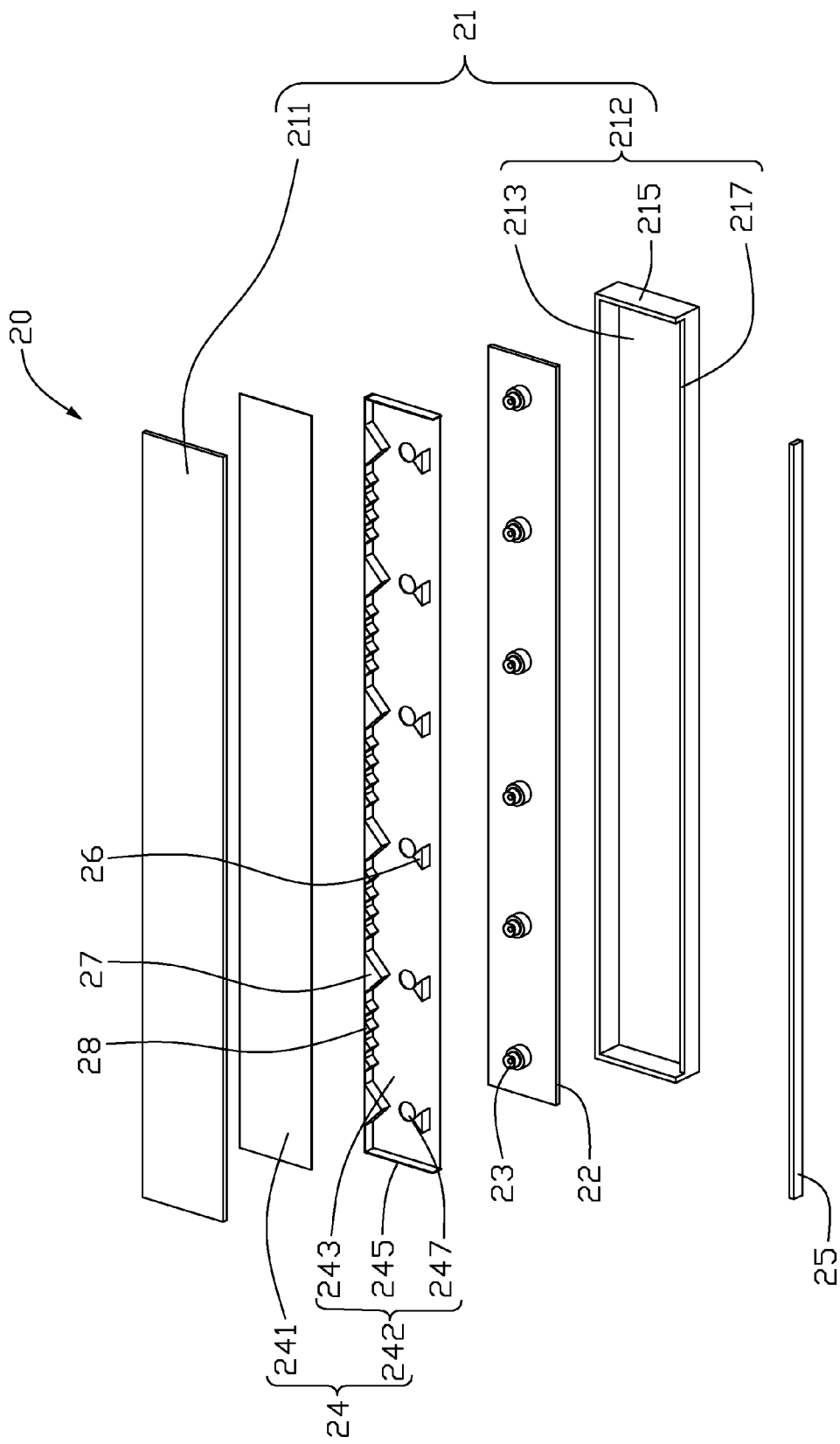
FIG. 1 is an exploded, isometric view of an LED lamp assembly according to a preferred embodiment of the present invention.
Figure 2:
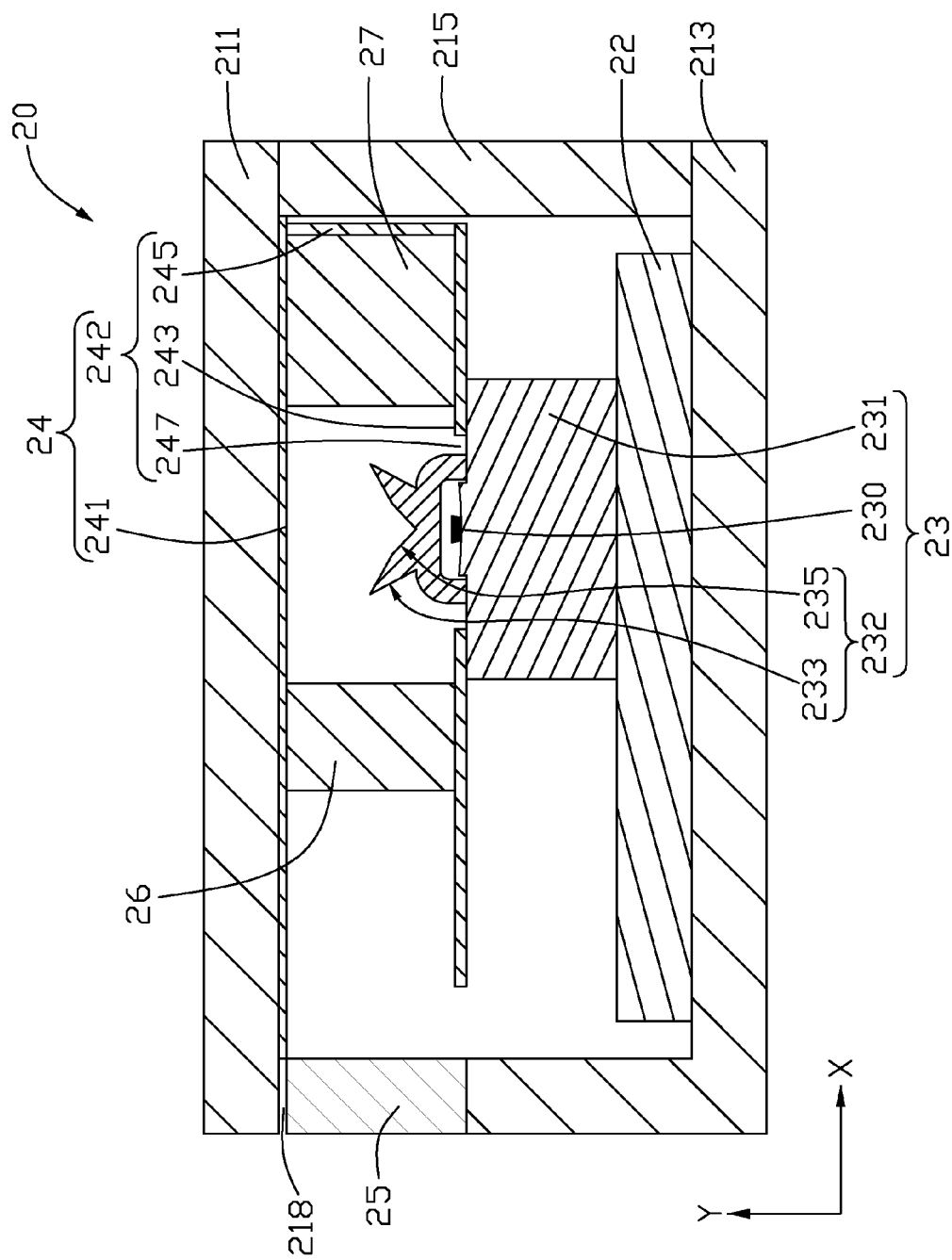
FIG. 2 is an assembled, side, cross-sectional view of the LED lamp assembly of FIG. 1.
Figure 3:
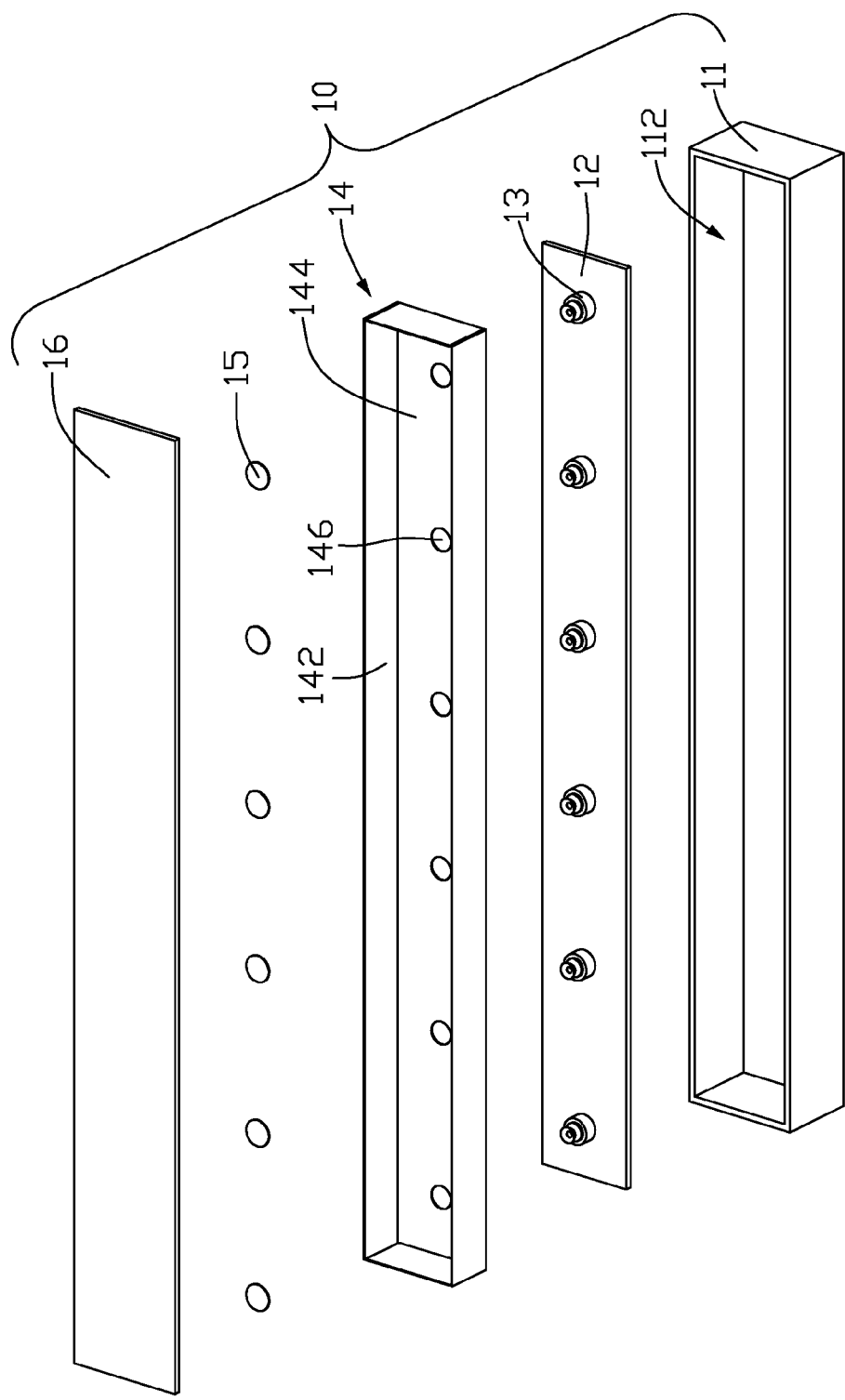
FIG. 3 is an exploded, isometric view of a conventional LED lamp assembly.

Referring to FIGS. 1 and 2, an LED lamp assembly 20 in accordance with a preferred embodiment of the present invention is shown. The LED assembly 20 includes a housing 21, a printed circuit board 22, a plurality of side-emitting type LEDs 23, a light reflective module 24, a lamp cover 25, and a plurality of first light distributing members 26.

The housing 21 is an elongated, hollow structure, which includes a top cover 211, and a receiving box 212. The receiving box 212 has a base sheet 213 facing the top cover 211, three first sidewalls 215, and a second sidewall 217. The first sidewalls 215 and the second sidewall 217 connect with each other, and extend from a periphery of the base 213 toward the top cover 211. A height of the second sidewall 217 is smaller than the first sidewall 215, therefore the top cover 211 and the receiving box 212 cooperatively define an opening 218 between a top of the second sidewall 217 and an edge of the top cover 211.

The printed circuit board 22 is positioned on the base sheet 213. Each LED 23 includes a base portion 231 fixed to the printed circuit board 22, a semiconductor chip 230 fixed on the base portion 231, and an optical lens 232 mounted onto the base portion 231. The base portion 231 and the optical lens 232 cooperate to completely surround the semiconductor chip 230. The optical lens 232 has a light-emitting side surface 233 and a top surface 235 adjoining the light-emitting side surface 233. A portion of the light-emitting side surface 233 faces the opening 218, and the top surface 235 faces the top cover 211. In the illustrated embodiment, the top surface 235 has an inverted conical shape.

The light reflective module 24 is utilized for reflecting light generated by the LEDs 23 out of the LED lamp assembly 20 via the opening 218. The light reflective module 24 can be made of either metal materials or plastic materials. In the illustration embodiment, the light reflective module 24 includes a top reflective plate 241, and a reflective box 242. The reflective box 242 has a bottom reflective plate 243 facing the top reflective plate 241, three side reflective plates 245 extending from a periphery of the bottom reflective plate 243, and a plurality of through holes 247 defined in the bottom reflective plate 243. The top reflective plate 241 adjoins to the top cover 211. The bottom reflective plate 243 is near the printed circuit board 22. The three side reflective plates 245 are in full contact with the three first sidewalls 215 correspondingly. The optical lens 232 passes through the corresponding through hole 247. The base portions 231 of the LEDs 23 support the bottom reflective plate 243 of the light reflective module 24. In alternative embodiments, the bottom reflective plate 243 can be disposed on the printed circuit board 22 with the LEDs 23 passing entirely through the through holes 247.

The first light distributing member 26 is utilized for distributing the light from the LEDs 23. The first light distributing members 26 are located between the LEDs 23 and the opening 218 of the housing 21. The first light distributing member 26 can be made of metal materials or plastic materials. In the illustration embodiment, the first light distributing members 26 are positioned on the bottom reflective plate 243. Each first light distributing member 26 is substantially a prism in shape that includes three connecting side surfaces and a top surface connecting the three connecting side surfaces. Each of the side surfaces is substantially a rectangle in shape, and the top surface is substantially a triangle in shape. In an alternative embodiment, the LED lamp assembly 20 further includes a plurality of second light distributing members 27 and a plurality of third light distributing members 28. The second light distributing members 27 are located at another side of the LEDs 23 opposite to the first distribution member 26, and protrude from the side reflective plate 245. The third light distributing members 28 are located between and connecting to the second light distributing members 27. A horizontal cross-section of each second light distributing member 27 is larger than that of each third light distributing member 28. It can be understood that, the first light distributing members 26, the second light distributing members 27, and the third light distributing members 28, can be integrally formed with the bottom reflective plate 243, or can be formed separately and fixed to the bottom reflective plate 243.

The lamp cover 25 covers the opening 218 of the housing 21. The lamp cover 25 can be either a light diffusion plate or transparent plate.

In the LED lamp assembly 20, the portion of the light-emitting side surface 233 faces the opening 218, and the top surface 235 faces the top cover 211. Therefore an occupying space in length parallel to X-axis of the housing 21 can be utilized fully, and the occupying space in height parallel to Y-axis of the housing 21 can be reduced. Thus the LED lamp assembly 20 can have a small volume due to the reducing occupying space in height parallel to Y-axis, while also preventing dark strips on the lamp cover 25 caused by reduced intensity of light between the adjacent LEDs 23 because of the full use of the occupying space in height parallel to Y-axis. In addition, since the first light distributing members 26 are located between the LEDs 23 and the opening 218 of housing 21, most light from the LEDs 23 cannot exit along a direction normal to the surface of the lamp cover 25. Thus, dark areas around the LEDs 23 are eliminated, and a uniformity of light exiting from the LED lamp assembly 20 is improved. Furthermore, since a surface structure of the second light distributing member 27 or the third light distributing member 28 changes gradually and continuously, some portions of light projected on the second light distributing members 27 or the third light distributing members 28 are reflected along a predetermined direction, thereby changing a light-emitting direction of the amount of light. Thus the uniformity of light exiting from the LED lamp assembly 20 is further improved.

It is noted that the scope of the present the LED lamp assembly is not limited to the embodiments described above. For example, the light reflective module 24 can be a reflective coating formed on top cover 211, sidewalls 215 and printed circuit board 22. The first light distributing member 26, the second light distributing member 27 or the third light distributing member 28 can be a V-shaped sheet. The side surfaces facing the LED 23 of the first light distributing member 26, the second light distributing member 27 or the third light distributing member 28 can be a plane or an arched surface in shape.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A Light Emitting Diode (LED) lamp assembly comprising:
    a housing having a base sheet, a top cover facing the base sheet, a plurality of sidewalls connecting the top cover and the base sheet, and an opening defined in one of the sidewalls;
    a printed circuit board positioned on the base sheet;
    at least one LED electrically connected to the printed circuit board, each LED comprising a light-emitting side surface and an inverted conical top surface adjoining to the light-emitting side surface, a portion of the light-emitting side surface facing the opening, and the top surface facing the top cover;
    a reflective module having a bottom reflective member located above the base sheet, wherein the bottom reflective member defines at least one through hole for allowing the at least one LED passing therethrough correspondingly;
    at least one first-light-distributing member located in the housing between the at least one LED and the opening correspondingly, wherein the at least one first light distributing member is substantially a prism in shape that includes three connecting side surfaces and a top surface connecting the three connecting side surfaces, each of the side surfaces is substantially rectangular, and the top surface is substantially triangular, and two side surfaces facing the at least one LED; and
    a lamp cover covering the opening.

2. The LED lamp assembly according to claim 1, wherein the lamp cover is one of a transparent plate and a light diffusion plate.

3. The LED lamp assembly according to claim 1, wherein the bottom reflective member is positioned on the printed circuit board.

4. The LED lamp assembly according to claim 1, wherein the at least one LED comprises a base portion being in contact with the printed circuit board, the base portion supporting the bottom reflective member.

5. The LED lamp assembly according to claim 1, wherein the at least one first-light-distributing member is made of one of metal and plastic materials.

6. The LED lamp assembly according to claim 1, wherein the LED lamp assembly further comprises at least one second-light-distributing member, the at least one second-lightdistributing member is a prism in shape, and the at least one second-light-distributing member is located at another side of the at least one LED opposite to the at least one first distribution member.

7. The LED lamp assembly according to claim 6, wherein the LED lamp assembly further comprises at least one third-light-distributing member, the at least one third-light-distributing member is a prism in shape, and the at least one third-light-distributing member interconnects with the at least one second-light-distributing member.

8. The LED lamp assembly according to claim 7, wherein a horizontal cross-section of the at least one second-light-distributing member is larger than a horizontal cross-section of the at least one third-light-distributing member.

9. The LED lamp assembly according to claim 1, wherein the reflective module is made of metal materials or plastic materials.

10. The LED lamp assembly according to claim 1, wherein the reflective module is a reflective coating.

* * * * *